US009937091B1

(12) United States Patent
Chen

(10) Patent No.: US 9,937,091 B1
(45) Date of Patent: Apr. 10, 2018

(54) BED SUPPORTING DEVICE

(71) Applicant: Ko-Po Chen, Taichung (TW)

(72) Inventor: Ko-Po Chen, Taichung (TW)

( * ) Notice: Subject to any disclaimer, the term of this patent is extended or adjusted under 35 U.S.C. 154(b) by 0 days.

(21) Appl. No.: 15/633,305

(22) Filed: Jun. 26, 2017

(51) Int. Cl.

| | |
|---|---|
| ***A61G 7/05*** | (2006.01) |
| ***F16M 11/16*** | (2006.01) |
| ***A47C 19/04*** | (2006.01) |
| *A61G 7/012* | (2006.01) |

(52) U.S. Cl.
CPC .......... *A61G 7/0516* (2016.11); *A47C 19/045* (2013.01); *A47C 19/04* (2013.01); *A61G 7/012* (2013.01)

(58) Field of Classification Search
CPC ................................ A61G 7/05; F16M 11/16
USPC ...... 248/188, 188.1, 188.8; 5/110, 114, 205, 5/210, 310
See application file for complete search history.

(56) References Cited

U.S. PATENT DOCUMENTS 4,745,867 A * 5/1988 Niemiec .............. A47B 13/021 108/158
2007/0205343 A1* 9/2007 Andreoli .................. F16M 7/00 248/188.8

* cited by examiner

*Primary Examiner* — Fredrick C Conley
(74) *Attorney, Agent, or Firm* — Rabin & Berdo, P.C.

(57) ABSTRACT

A bed supporting device adapted to be installed to a bottom seat of a bed includes a leg unit; a first link board connected to an upper end of the leg unit, and formed with a first through hole; and a second link board for connection to the bottom seat, installed on the first link board and formed with a second through hole corresponding to the first through hole; wherein, either the first or second through hole is elongated such that a fixing screw can extend through the first and second through holes in the first and second link boards for coupling a fastener, thereby immobilizing the first and second link boards.

3 Claims, 14 Drawing Sheets

BED SUPPORTING DEVICE

BACKGROUND OF THE INVENTION

1. Field of the Invention

The present invention relates to a supporting device, more particularly to a bed supporting device for a bed, in which the height of the bed can be altered, a reciprocal movement or swinging of the bed relative to its legs along forward and rearward directions can be performed.

2. The Prior Arts

Due to tension and stress of our daily busy life, a majority of people cannot go to sleep soundly at nights or they cannot enjoy sound sleep at nights such that the stress and tension thereof cannot be gotten rid off.

A conventional bed includes a bed frame, which weight and height is supported and adjusted by means of the fastener screws. It is noted that height adjustment of the bed frame is laborious and tiresome due to relatively heavy weight of the bed and complicated process. Frequent threaded in or threaded out action of the fastener screws relative to the bed frame often lead wear out of threads from the stems of fastener screws and resulting in wobbling of the bed frame relative to the support legs. It requires precise skill and is difficult to repair or replace the worn-out threads on the stem of the fastener screws. In other words, repairing is laborious and time-consuming and hence causes high expenses.

SUMMARY OF THE INVENTION

A primary objective of the present invention is to provide a bed supporting device, when integrated together with a bed frame, the height of the bed relative to a support surface can be adjusted.

Another objective of the present invention is to provide a bed supporting device, which is relatively strong and rigid to provide support effort the bed frame and which can be assembled and/or disassembled easily for transportation.

Yet another objective of the present invention is to provide a bed supporting device, in which a reciprocal movement of and/or swinging action of a slide frame and the bed relative to the supporting surface in forward and rearward directions can be conducted.

In order to achieve the aforesaid the objective, a bed supporting device of the present invention is adapted to be installed to a bottom seat of a bed, includes: a leg unit; a first link board connected to an upper end of the leg unit and formed with at least one first through hole; and a second link board adapted to be connected to the bottom seat of the bed, installed on the first link board, and formed with at least one second through hole corresponding to the first through hole; wherein, either the first or second through hole is elongated such that a fixing screw can extend through the first and second through holes in the first and second link boards for coupling a fastener, thereby immobilizing the first and second link boards.

After assembly of the supporting device of the present invention to a bed, a horizontal plane of the bottom seat of the bed and the leg unit define an acute angle, which is lesser than 90 degree or an obtuse angle which is greater than 90 degrees such that the leg unit extends outward and inclinedly from the bottom seat of the bed due to the acute angle or the obtuse angle such that the leg units are supported stably by a supporting surface.

Preferably, the bed supporting device of the present invention further includes an anti-slippery unit that has a cushion plate disposed at a bottom end of the leg unit and formed with a screw hole.

Preferably, the anti-slippery unit further includes an anti-slip pad disposed below the cushion plate opposite to the bottom end of the leg unit so as to be contact with a support surface and a fastener screw extending threadedly through the screw hole in the cushion plate for fastening the anti-slip pad such that the support surface cannot be scratched by movement of the leg units thereon.

In one embodiment of the present invention, the first through hole in the first link board is elongated in cross section while the second through hole in the second link board is circular in cross section. In another embodiment, the first through hole in the first link board is circular in cross section while the second through hole in the second link board is elongated in cross section. Note that the configuration of the through holes should not be limited only to the disclosed ones, any other configurations so long it can provide the similar function should be included.

Preferably, each of the first and second link boards has a coupling face formed with a shallow groove pattern to provide additional friction between the coupling faces after the coupling of the first and second link boards.

For coupling the first and second link boards together, a fixing screw is inserted through the first and second through holes in the first and second link boards for coupling with a fastener, thereby immobilizing the first and second link boards. By varying the extension position of the fixing screw through the first and second through holes in the first and second link boards for fastening with the fastener, the height of the bed with respect to the leg unit can be adjusted.

In one embodiment of the present invention, the bed further has a horizontal moving structure disposed above the bottom seat and includes plurality of roller units, each unit consists of an upper and lower roller, a slide frame and a driving structure. The slide frame has an upper part fixed to the bed and a lower part attached to the upper and lower rollers of the roller units. The bottom seat has a central portion, a carrier board fixed to the central portion and front and rear pairs of slide bars fixed stationarily to left and right sides of the carrier board such that the upper and lower rollers are trained rotatably on the slide bars such that upon activation of the driving structure results in simultaneous rotation of the upper and lower rollers on the slide bars, which in turn results in reciprocal movement of slide frame and the bed relative to the bottom seat in forward and rearward directions along a horizontal line.

In one embodiment of the present invention, the bed further has a swinging mechanism including a swinging frame disposed above the bottom seat, a reciprocal swing driving member disposed between the swinging frame and the bottom seat for reciprocally driving the swinging frame in forward and rearward directions, wherein left and right sides of the bottom seat and left and right sides of the swinging frame are connected movably by a plurality of driving rods such that two corresponding sides of the swinging frame and the bottom seat and an adjacent pair of the driving rods cooperatively form a rectangular structure.

In the bed supporting device of the present invention, for coupling the first and second link boards together, a fixing screw is inserted through the first and second through holes in the first and second link boards for coupling with a fastener, thereby immobilizing the first and second link boards. By varying the extension position of the fixing screw through the first and second through holes in the first and second link boards for fastening with the fastener, the height of the bed with respect to the leg unit can be adjusted. In other words, repairing or replacing the worn-out threads on the stem of the fastener screws encountered in the conventional bed supporting device can be avoided. Moreover, the presence of the horizontal moving structure and the swinging mechanism, which move the bed reciprocally in forward and rearward direction assists and enhances the sleeping quality of a sleeper on the bed.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
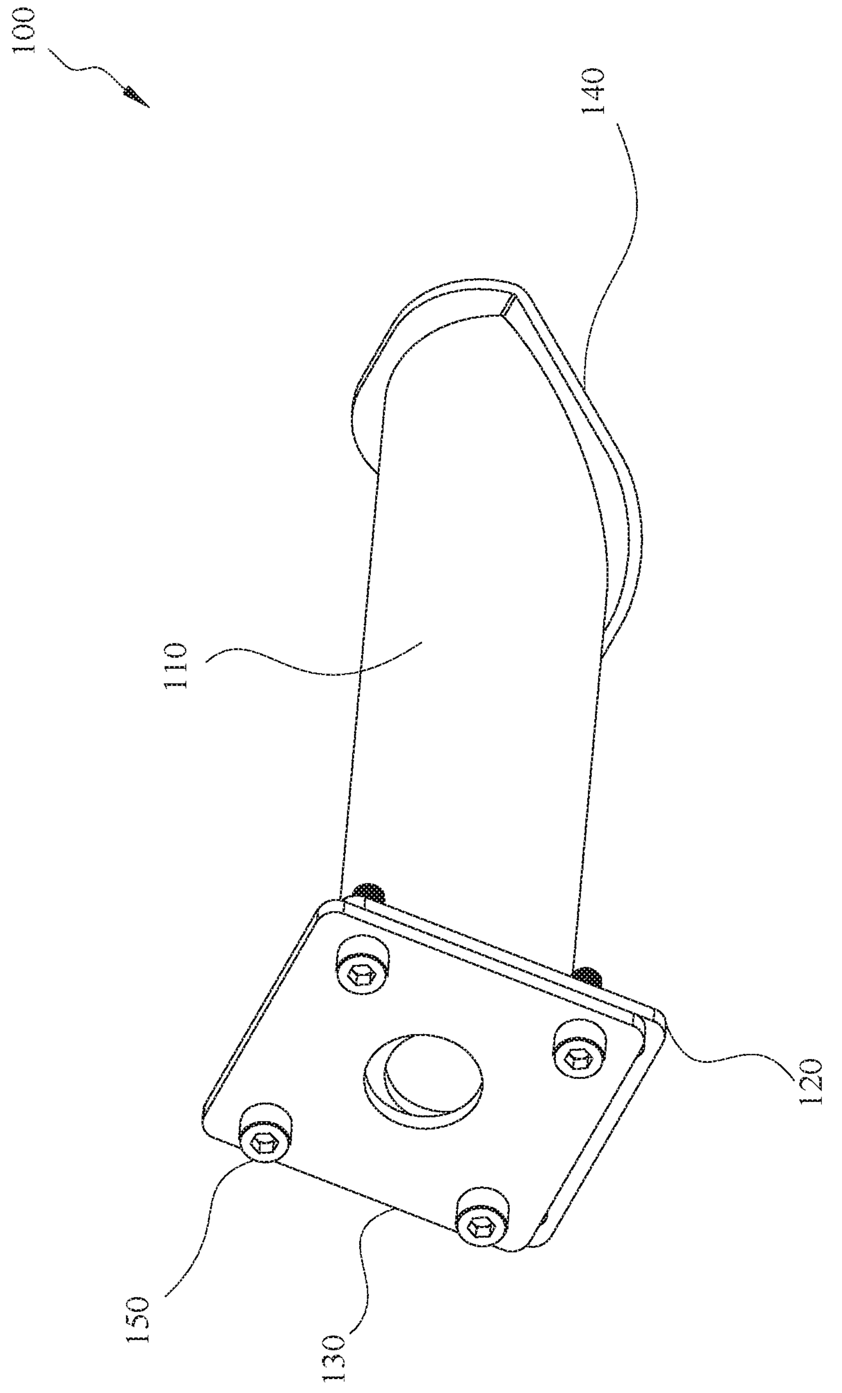
FIG. 1 is a perspective view of a bed support device according to a first embodiment of the present invention.
Figure 2:
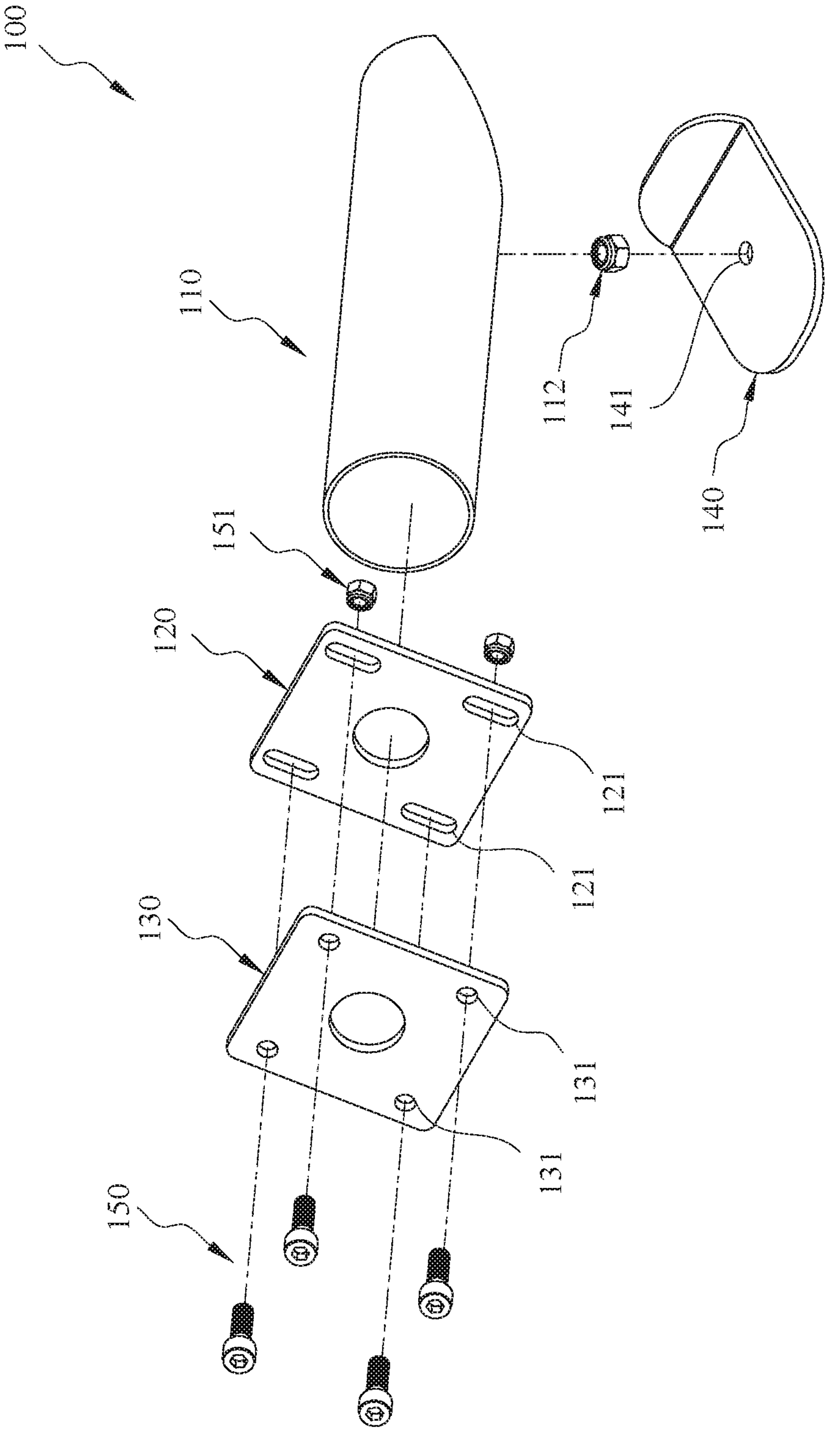
FIG. 2 is a perspective and exploded view of the bed support device according to the first embodiment of the present invention.

Referring to FIGS. 1 to 2, wherein FIG. 1 is a perspective view of a bed support device according to a first embodiment of the present invention; and FIG. 2 is a perspective and exploded view of the bed support device according to the first embodiment of the present invention. As shown, a bed supporting device 100 of the present invention is adapted to be installed to a bottom seat 171 of a bed 170 (see FIG. 6A), includes: four leg units 110; a plurality of first link boards 120; and a plurality of second link boards 130.

Figure 3A:
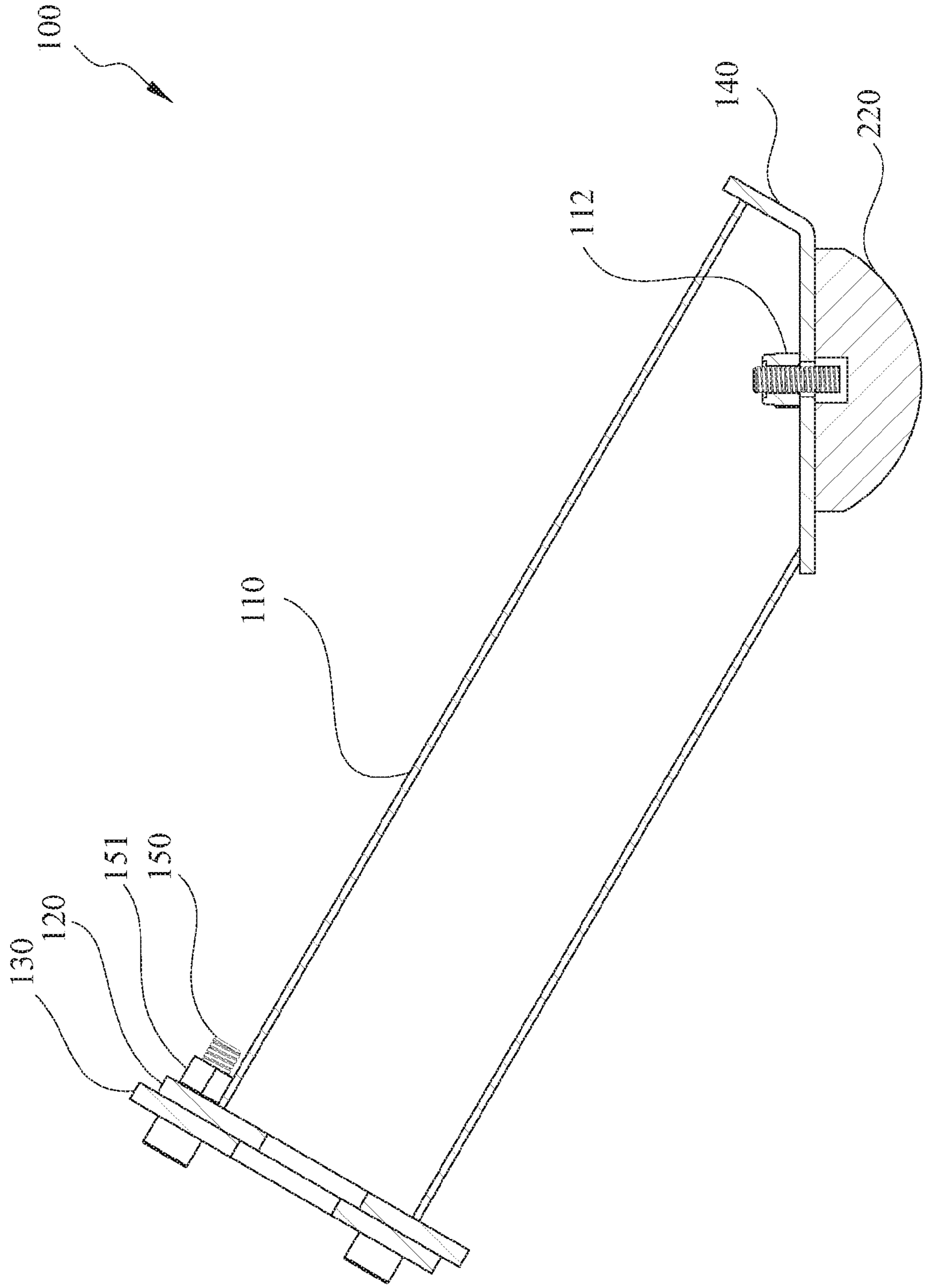
FIG. 3A is a fragmentary sectional view of the bed support device according to the first embodiment of the present invention not visible in FIGS. 1 and 2.

The bed supporting device 100 of the present invention further includes an anti-slippery unit (see FIG. 3) that has an L-shaped cushion plate 140 that is disposed at a bottom end of each leg unit 110 and that is formed with a screw hole 141. The leg unit 110 is generally a hollow tube, but the scope should not be limited only to the disclosed ones.

Preferably, the anti-slippery unit further includes an anti-slip pad 220 disposed below the cushion plate 140 opposite to the bottom end of the leg unit 110 so as to be contact with a support surface and a fastener screw 112 extending threadedly through the screw hole in the cushion plate 140 for fastening the anti-slip pad 220 such that the support surface cannot be scratched by movement of the leg units 110 thereon. In one embodiment of the present invention, the fastener screw 112 is welded to the cushion plate 140 in such a manner to protrude downward from a bottom surface of the cushion plate 140 to extend into a receiving hole in the anti-slip pad 220.

Each first link board 120 is generally rectangular and is connected to an upper end of the leg unit 110, and is formed with four first through holes 121. Preferably, each of the first through holes 121 is elongated and the four through holes 121 are located at four corners of the first link board 120. Each second link board 130 is rectangular and is formed with four second through holes 131 corresponding to the first through holes 121. Preferably, each second through hole 131 is circular in cross section.

Note that the configurations of the first and through holes 121, 131 should be limited only to the disclosed ones. In another embodiment, the first through hole 121 in the first link board 120 is circular in cross section while the second through hole 131 in the second link board 130 is elongated in cross section.

Figure 3B:
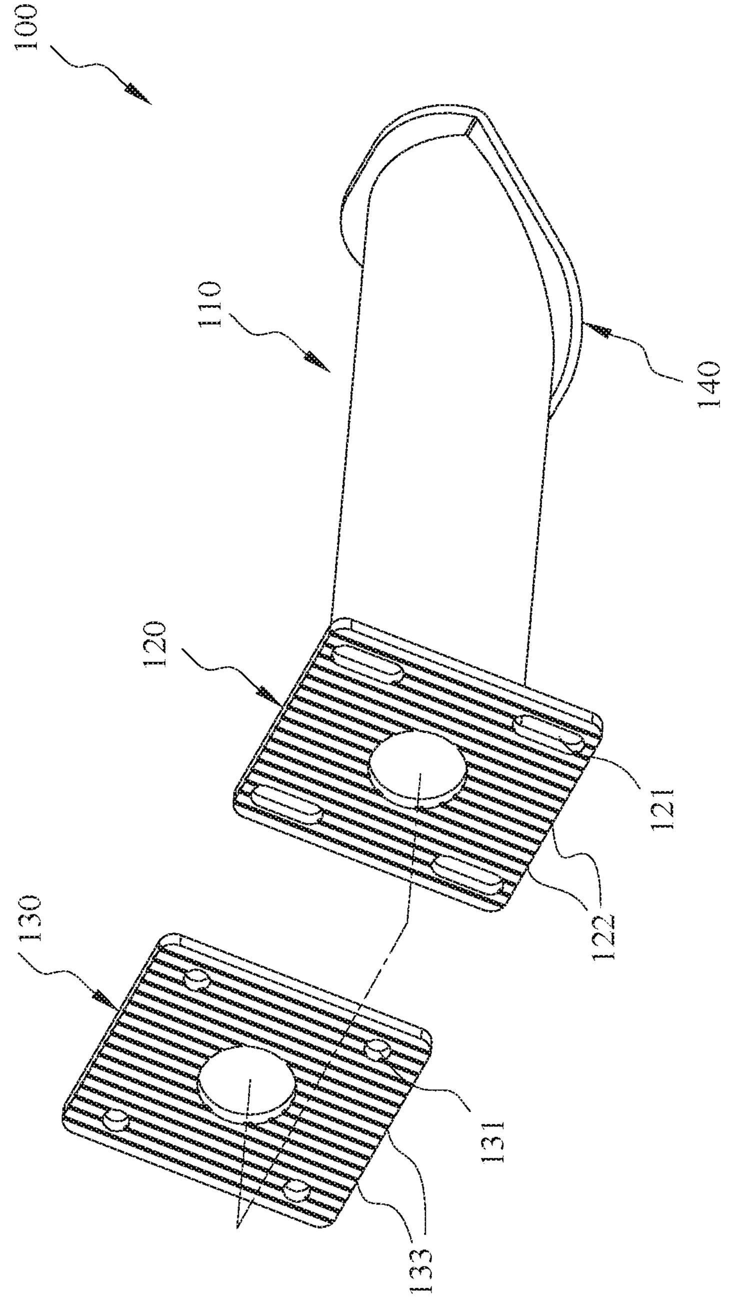
FIG. 3B is a perspective view of a bed support device according to a second embodiment of the present invention.

Each of the first and second link boards 120, 130 has a coupling face formed with a shallow groove pattern 122, 133 to provide friction between the coupling faces after the coupling of the first and second link boards 120, 130, as best shown in FIG. 3B.

For coupling the first and second link boards 120, 130, a fixing screw 150 can extend through the first and second through holes 121, 131 in the first and second link boards 120, 130 for coupling a fastener 151, thereby immobilizing the first and second link boards 120, 130, where the coupling faces abut each other and providing friction force therebetween. Note that since the second link board 130 is first of all attached to the bottom seat 171 of the bed 170, the extension position of the fixing screw 150 through the second through hole 131 can be adjusted to align with the through holes 121 in the first link board 120 for fastening with the fastener 151, thereby altering the position of the second link board 130 relative to the first link board 120, hence altering the height of the bed 170 relative to the leg unit 110. Preferably, conventional fastener screw and nut may serve the purpose of the fixing screw 150 and the fastener 151.

Figure 4A:
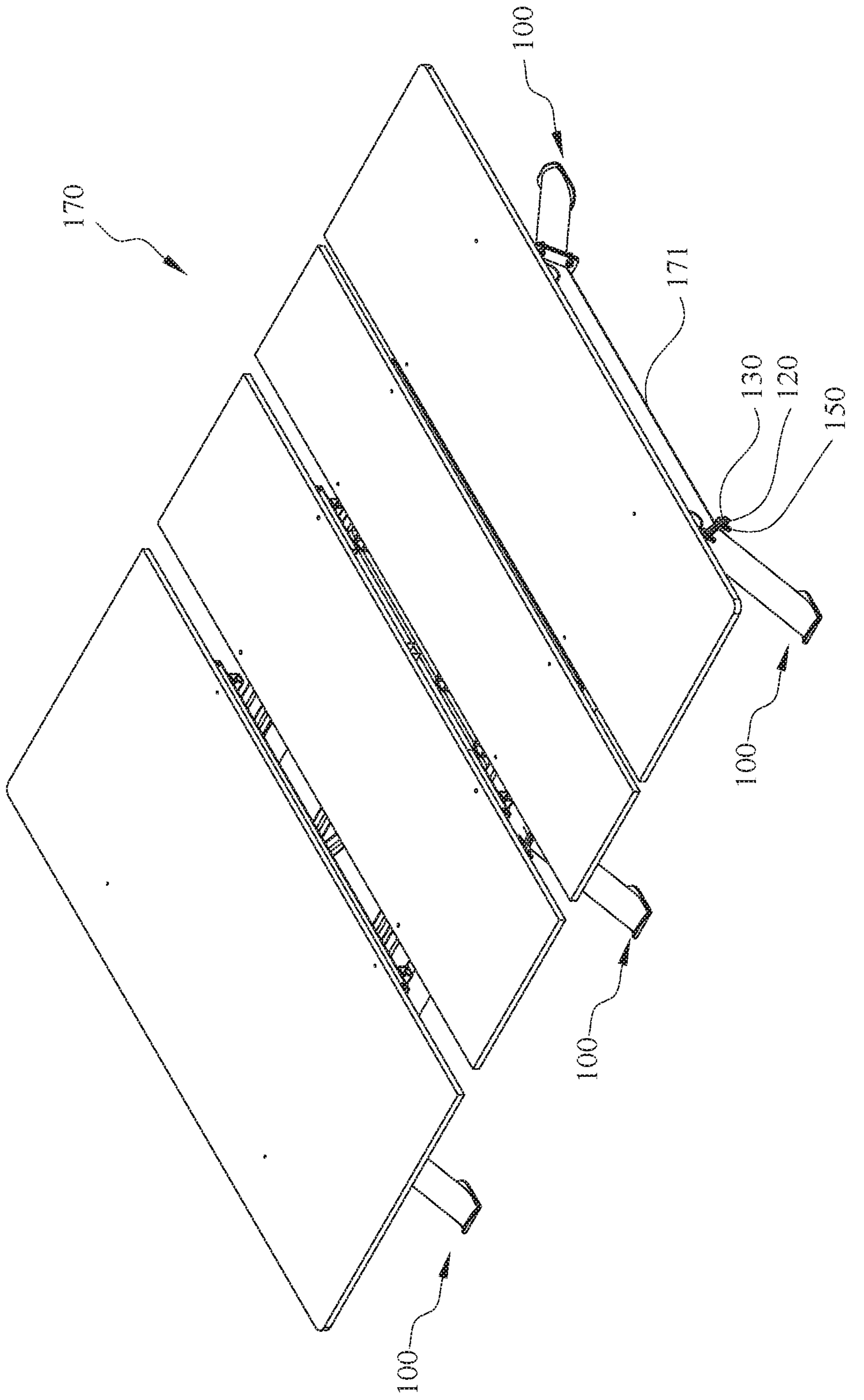
FIGS. 4A and 4B respectively illustrate the bed supporting device of the present invention in application with a bed.
Figure 4B:
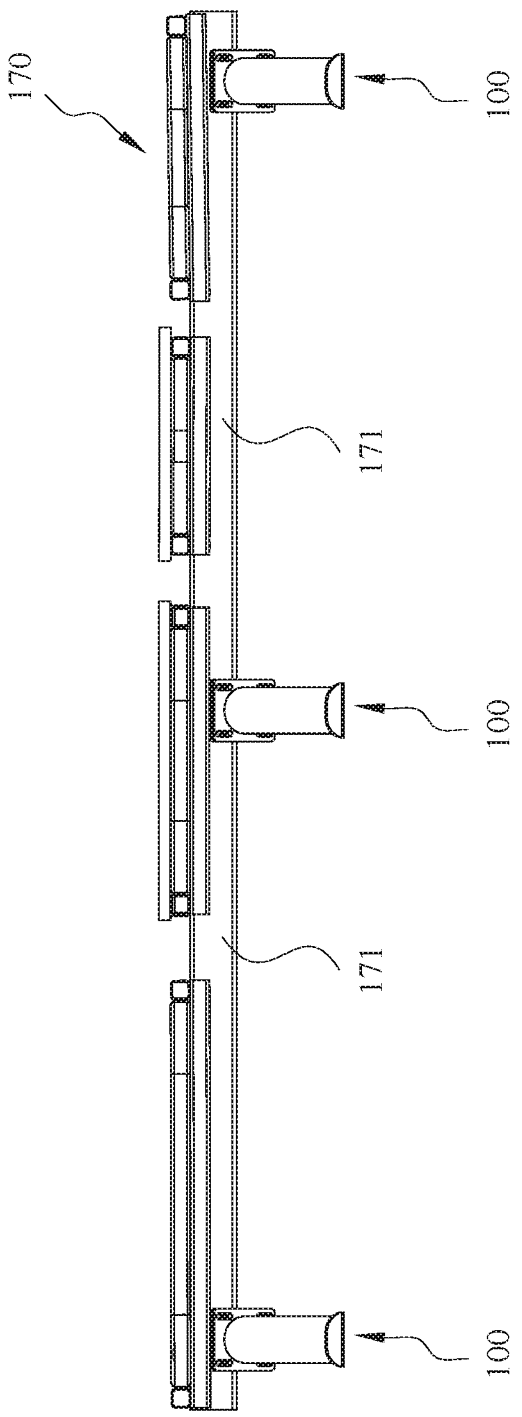

FIGS. 4A and 4B respectively illustrate the bed supporting device 100 according to the first embodiment of the present invention in application with a bed. As shown, four units of the bed supporting devices 100 are attached to the bottom seat 171 of the bed 170. In other words, two second link boards 130 are attached to each lateral side of the bottom seat 171 via the fixing screws 150.

Figure 5A:
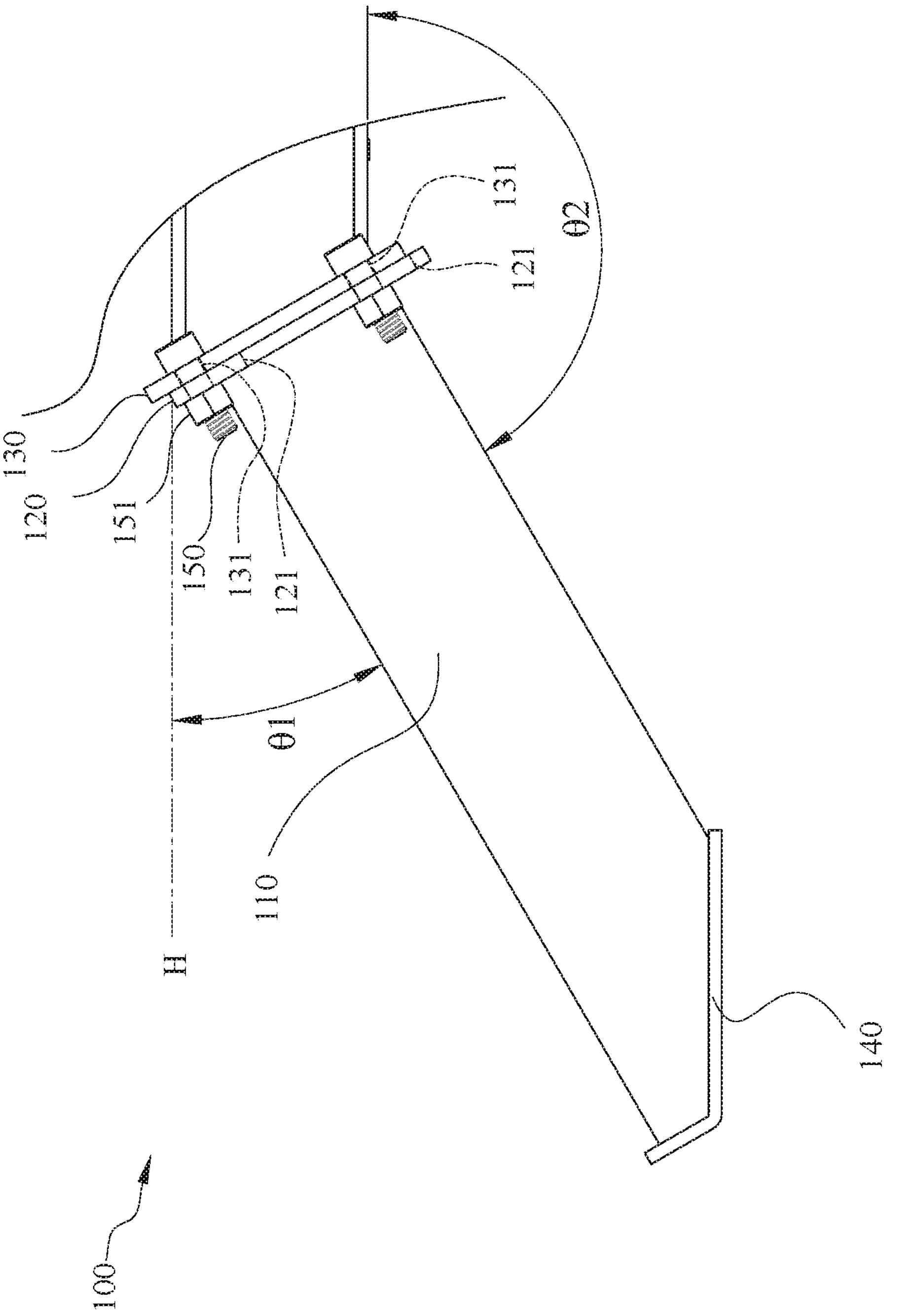
FIGS. 5A and 5B respectively illustrate how the bed supporting device of the present invention is attached to a bed.
Figure 5B:
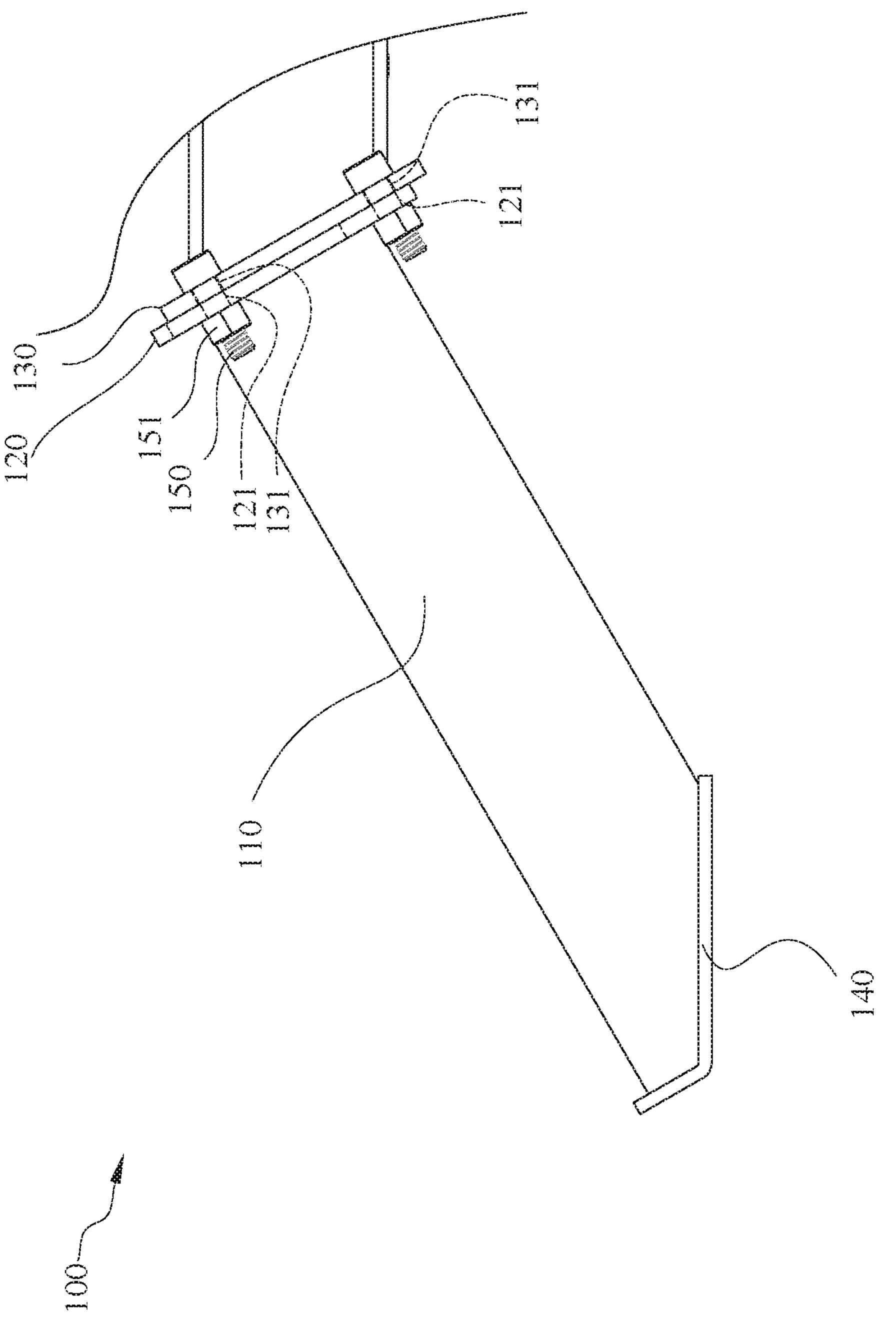

To be more specific, when it is desired to raise the height of the bed 170 relative to the leg units 110, the fixing screw 150 in the second through hole 131 is changed, as best shown in FIG. 5A, to align and thus extends through the top end of the first through hole 121 in the first link board 120 for fastening with the fastener 150. In reverse, when it is desired to lower the height of the bed 170 relative to the leg units 110, the fixing screw 150 is inserted through the second and first through holes 131, 121, as best shown in FIG. 5B, where the fixing screw 150 extends through the bottom end of the first through hole 121 for fastening with the fastener 150.

Note that after assembly of the supporting devices 100 of the present invention to the bed 170 as described above, a horizontal plane H of the bottom seat 171 of the bed 170 and the leg unit 110 define an acute angle $\theta_1$ in a clockwise direction, which is lesser than 90 degrees (see FIG. 5A) or an obtuse angle $\theta_2$ in an anti-clockwise direction, which is greater than 90 degrees (see FIG. 5A). To be more specific, the four leg units 110 extend inclinedly and outwardly from the bottom seat 171 of the bed 170 due to the acute angle $\theta_1$ or the obtuse angle $\theta_2$.

An important aspect is that to further enhance the coupling of the second link board 130 and the bottom seat 171, each second link plate 130 is further provided with at least one abutment stub 132 welded to the periphery confining the second link board 130 (see FIG. 7A) such that after installation, the abutment stub 132 of the second link board 130 abuts against the outer edge of the bottom seat 171, thereby providing additional stability of the bed 170 relative to the leg units 110.

Figure 6A:
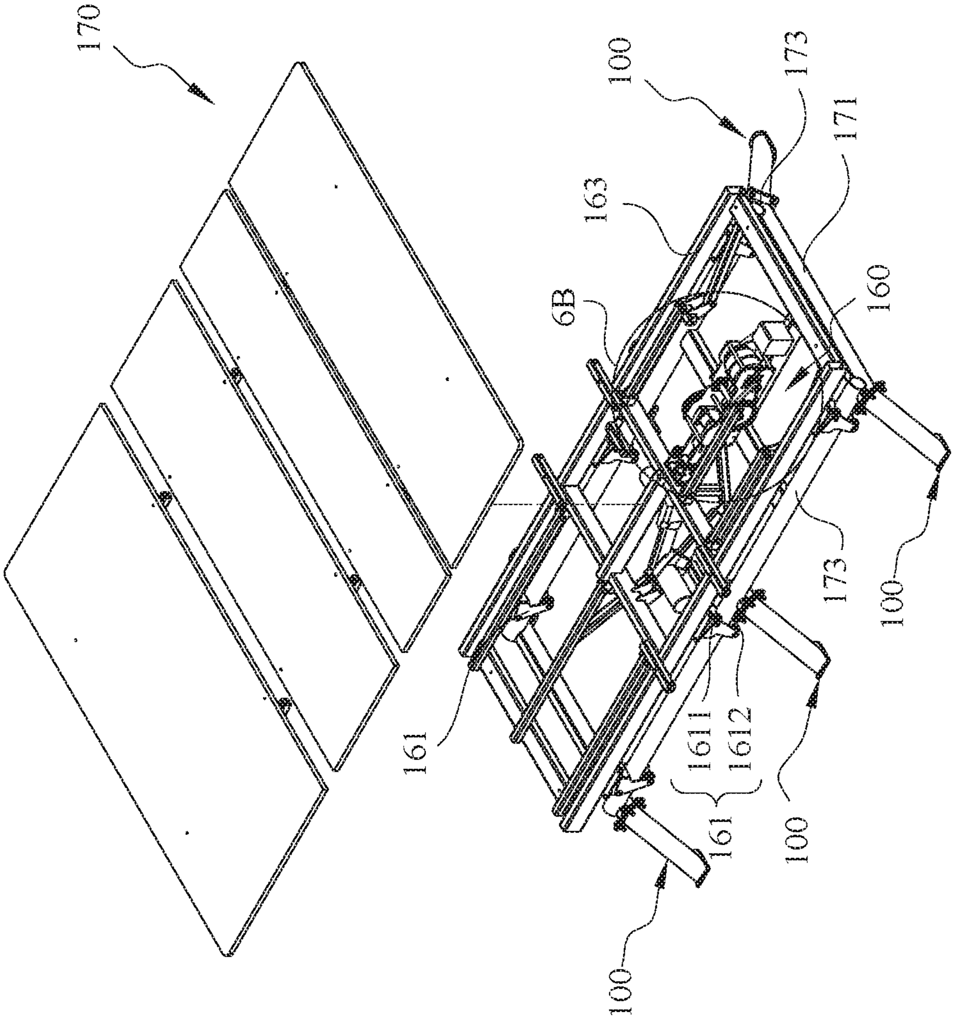
FIGS. 6A and 6B respectively illustrate exploded and enlarged views of a bed supporting device according to a third embodiment of the present invention shown together with a bed.
Figure 6B:
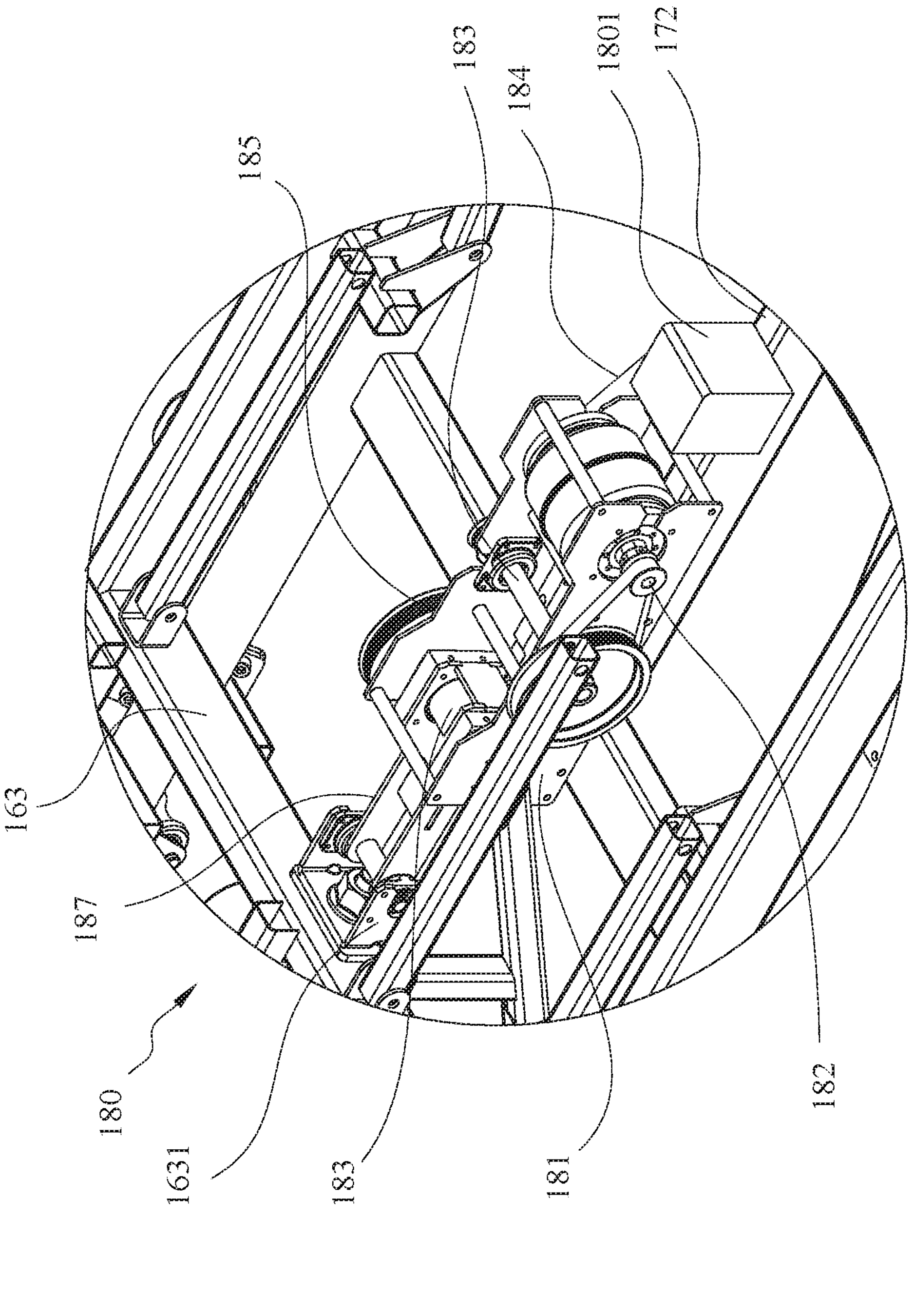

FIGS. 6A and 6B respectively illustrate exploded and enlarged views of a bed supporting device 100 according to a third embodiment of the present invention attached to a bed 170. The third embodiment is similar to the first embodiment, except that to provide sound sleep or enhance the sleeping quality, the bed 170 further has a horizontal moving structure 160 disposed above the bottom seat 171. The horizontal moving structure 160 includes a plurality of roller units 161, each unit consists of an upper and lower roller 1611, 1612; a slide frame 163 and a driving structure 180. The slide frame 163 has an upper part fixed to the bed 170 and a lower part attached to the upper and lower rollers 1611, 1612 of the roller units 161. The bottom seat 171 has a central portion, a carrier board 172 fixed to the central portion and front and rear pairs of slide bars 173 fixed stationarily to left and right sides of the carrier board 172 such that the upper and lower rollers 1611, 1612 are trained rotatably on the slide bars 173 such that upon activation of the driving structure 180 results in simultaneous rotation of the upper and lower rollers 1611, 1612 on the slide bars 173, which in turn results in reciprocal movement of slide frame 163 and the bed 170 relative to the bottom seat 171 in forward and rearward directions along a horizontal line.

To be more specific, the driving structure 180 preferably includes a driving unit 1801, such as motor, a crank shaft 187, a first belt unit 184, a second belt unit 185 and a pivot member 181 fixed on the carrier board 172 of the bottom seat 171 and having two opposite ends, and an axle 182 and an eccentric axle 183 fixed to opposite ends of the pivot member 181 such that one end of the axle 182 is coupled to the driving unit 1801 via the first belt unit 182 and pulleys or rollers while the other end of the axle 182 is coupled to the eccentric axle 183 via the second belt unit 185 and pulleys or rollers. After which, one end of the crank shaft 187 is coupled pivotally the eccentric axle 183 and the slide frame 163 while the other end of the crank shaft 187 is coupled pivotally to the slide frame 163 via a pivot portion 1631 such that activation of the driving unit 1801 causes rotation of the eccentric axle 183, which drives the crank shaft 187 as well as the slide frame 163 relative to the bottom seat 171 to move reciprocally in the forward and rearward directions.

Note that no complicated and high precision is required for training the upper and lower rollers 1611, 1612 on the slide bars 173, the rollers 1611, 1612 in turn result in reciprocal movement of slide frame 163 and the bed 170 relative to the bottom seat 171 in forward and rearward directions along a horizontal line.

To be more specific, because the first belt unit 184 drives the axle 18 and the second belt unit 185 drives the eccentric axle 183 and since the crank shaft 187 swings about the eccentric axle 183, activation of the driving unit 1801 drives the crank shaft 187 and the slide frame 163 and the bed 170 relative to the bottom seat 171 in forward and rearward directions along a horizontal line.

Figure 7A:
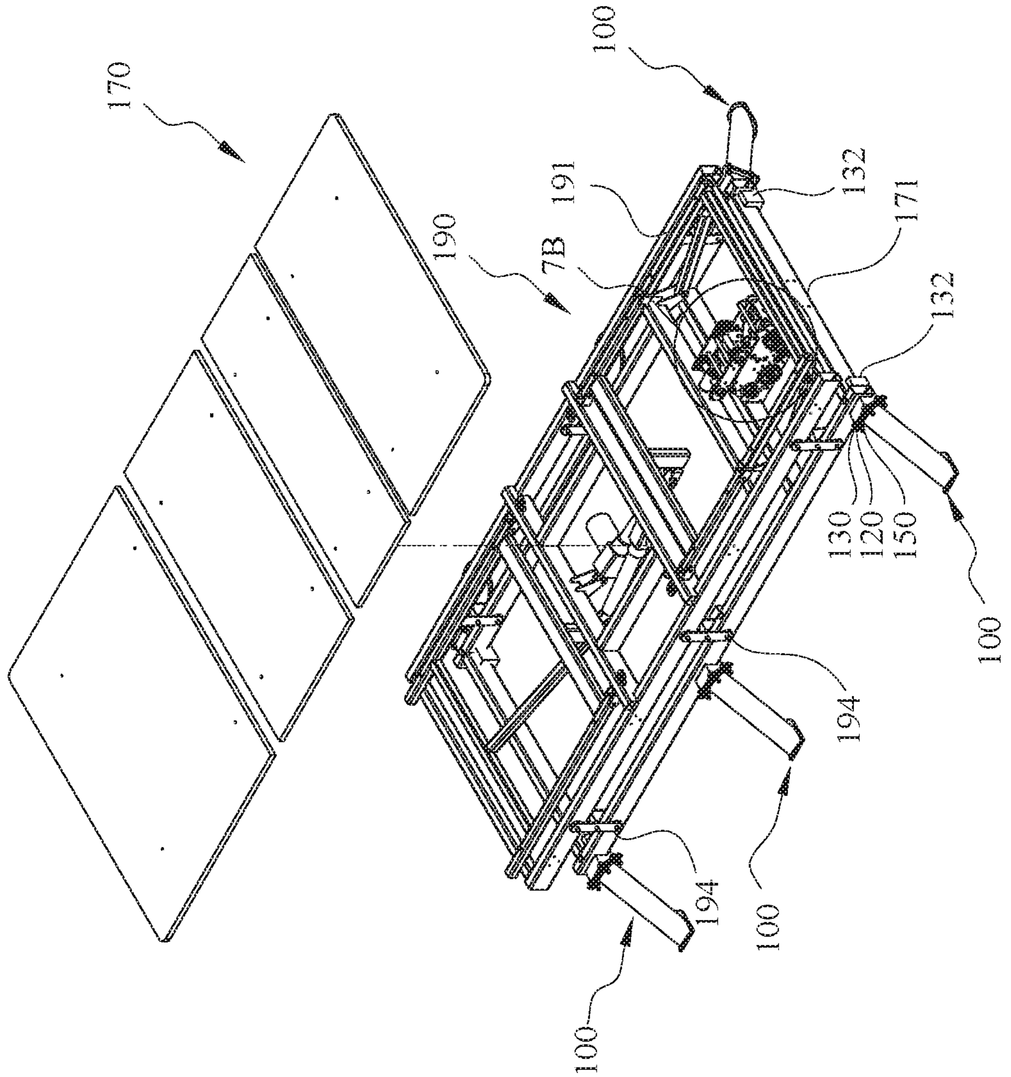
FIGS. 7A and 7B respectively illustrate exploded and enlarged view of a bed supporting device according to a fourth embodiment of the present invention shown together with a bed.
Figure 7B:
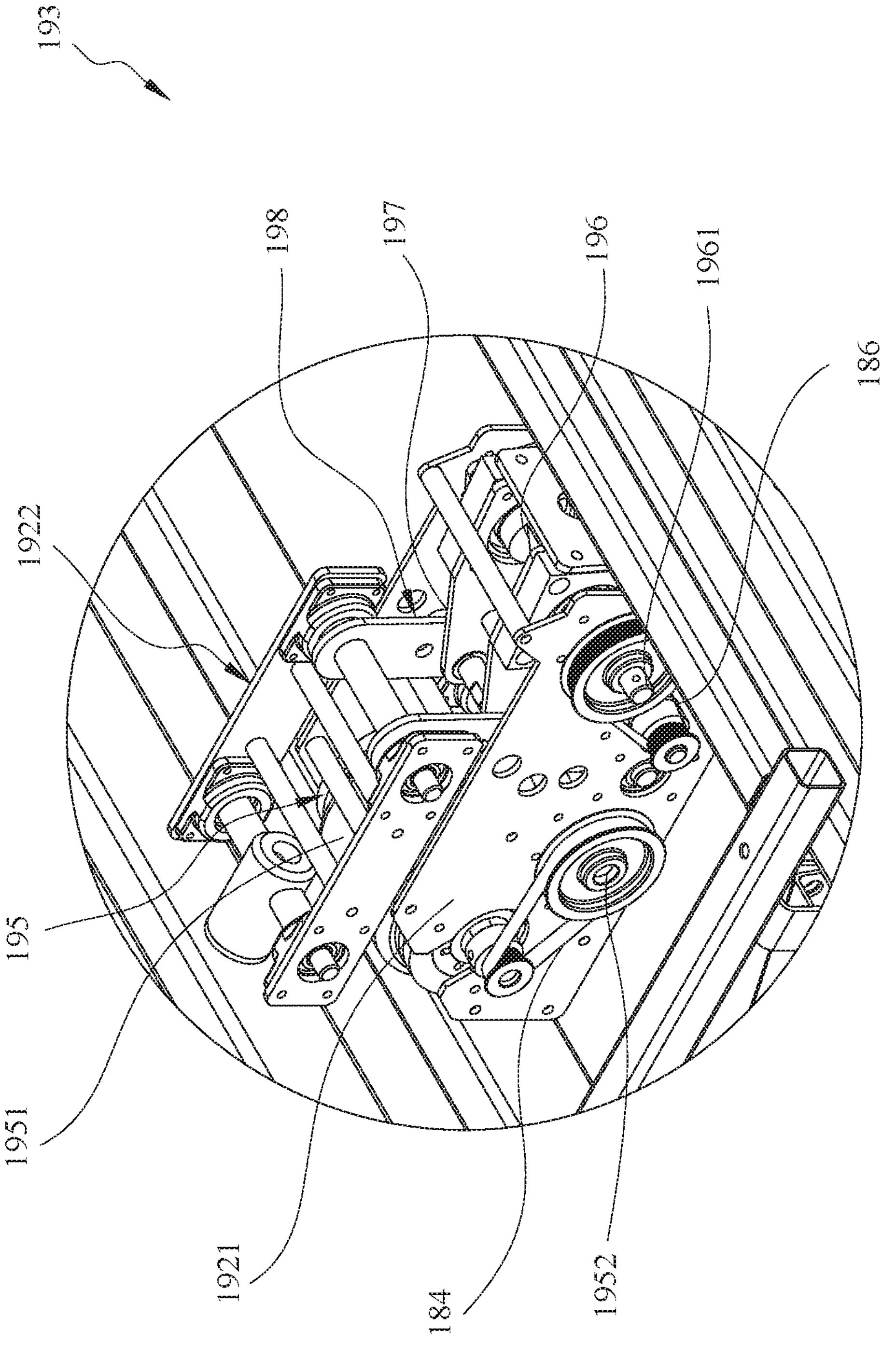
Figure 7C:
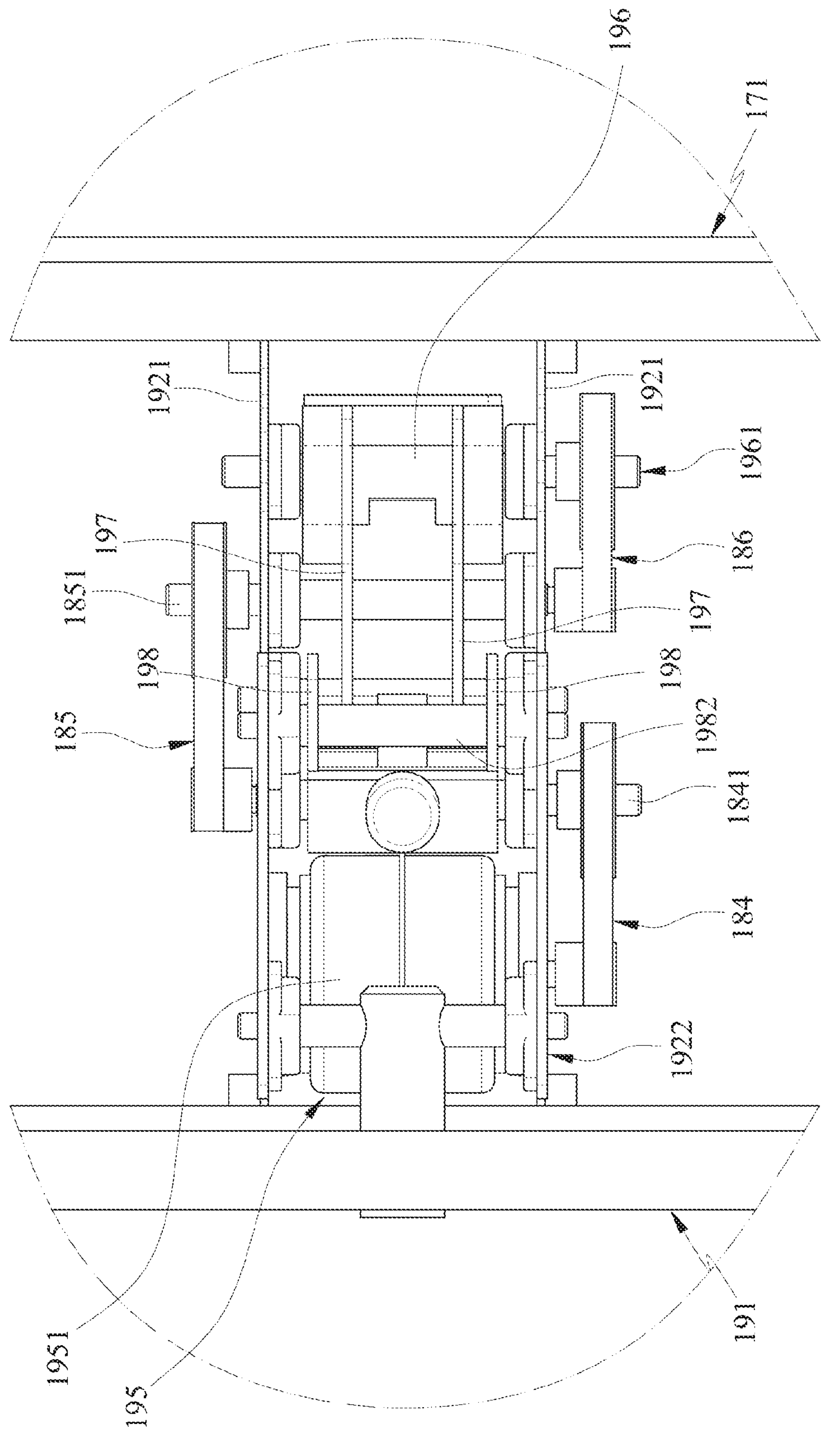
FIG. 7C is a top planar view of a swing driving member shown in FIGS. 7A and 7B.

Referring to FIGS. 7A-7C, wherein FIGS. 7A and 7B respectively illustrate exploded and enlarged view of a bed supporting device 100 according to a fourth embodiment of the present invention attached to a bed. The fourth embodiment is similar to the first embodiment, except the fourth embodiment further includes a swinging mechanism 190. The swinging mechanism 190 preferably includes a swinging frame 191 having an upper part fixed to the bed 170 and a lower part movably disposed above the bottom seat 171, and a reciprocal swing driving member 193 disposed between the swinging frame 191 and the bottom seat 171 for reciprocally swinging the swinging frame 191 in forward and rearward directions.

To be more specific, the left and right sides of the bottom seat 171 and left and right sides of the swinging frame 191 are connected movably pivotally by a plurality of driving rods 194 such that two corresponding sides of the swinging frame 191 and the bottom seat 171 and an adjacent pair of the driving rods 194 cooperatively form a rectangular structure (see FIG. 7A). Preferably, the bottom seat 171 has two vertical partitions 1921 at its central portion defining a reception space to accommodate the swing driving member 193, which swing the swinging frame 191 to move reciprocally in the forward and rearward directions relative to the bottom seat 171.

Note that the second link boards 130 of the bed supporting device 100 of the present invention are fixed to the bottom seat 170 in such a manner that after installation, the abutment stub 132 (see FIG. 7A) of the second link boards 130 abuts against the outer edge of the bottom seat 171, thereby providing additional stability of the bed 170 relative to the leg units 110.

The swing driving member 193 preferably includes a first driving source 195 disposed on the bottom seat 171 for driving the eccentric part 196 of a crank shaft 1961, wherein the eccentric part 196 is connected pivotally to a first swing arm unit 197 such that driving of the crank shaft 1961 results in rotation of the eccentric part 196 and thus swinging the first swing arm unit 197 reciprocally relative to the bottom seat 171.

In this embodiment, the first driving source 195 includes a first motor 1951 provided between the two vertical partitions 1921 of the bottom seat 171, wherein an output end of the first motor 1951 is coupled to the crank shaft 1961 via a transmission structure (not visible) such that movement of the crank shaft 1961 drives the eccentric part 196 and the swing arm 197.

FIG. 7C is a top planar view of the swing driving member 193 shown in FIGS. 7A and 7B. The aforesaid transmission structure preferably includes a first belt unit 184 trained over a first transmission axle 1841 and the output end of the driving shaft of the first motor 1951 through pulleys or rollers, a second belt unit 185 trained over the second transmission axle 1851 and the first transmission axle 1841 through pulleys or rollers and a third belt unit 186 trained over the second transmission axle 1851 for coupling with the crank shaft 1961 such that activation of the first motor 1951 drives the crank shaft 1961. The transmission structure further includes a second swing arm unit 198, which upper part is connected pivotally to the first swing arm unit 197 and the swinging frame 191 and a lower part journalled to a pivot axle 1981 such that the second swing arm unit 198 swings about the pivot axle 1981 when the first swing arm unit 197 swings relative to the bottom seat 171.

In this embodiment, a connection stem 1971 is used for pivotally connecting the first and second arm units 197 and 198 together. The upper end of the second arm unit 198 is provided with a pivot axle 1982 connected pivotally to a connection part 1922 of the swinging frame 191.

Figure 7D:
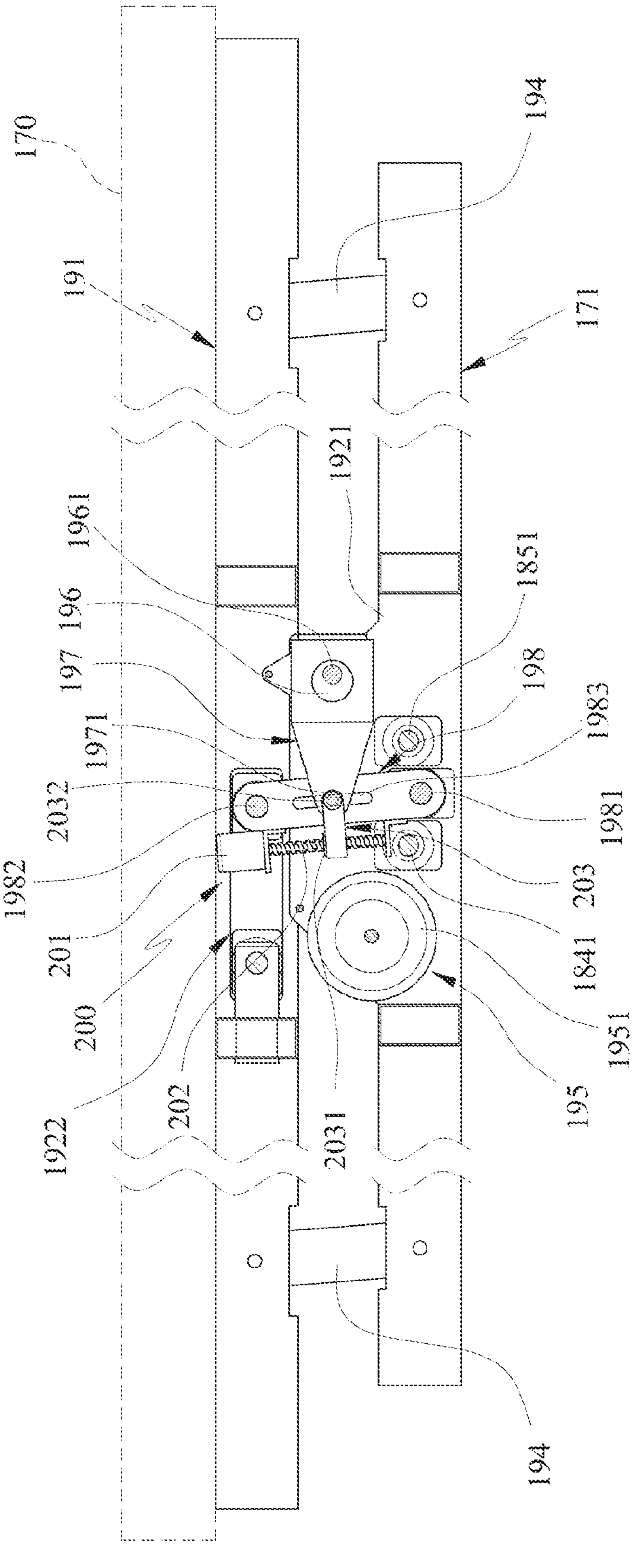
FIG. 7D is a lateral side view of the swing driving member shown in FIG. 7C.

FIG. 7D is a lateral side view of the swing driving member 93 shown in FIG. 7C. As shown, the swing driving member 93 further includes an angle displacement unit 200 for displacing the position of the connection stem 1971 interconnecting the first and second arm units 197, 198 so as to vary the distance between the connecting end of the connection stem 1971 on the first swing arm unit 197 relative to the pivot axle 1981 of the second swing arm unit 198 such that the first swing arm unit 197 causes swinging of the second swing arm unit 198 in a different angle. Preferably, the angle displacement unit 200 includes a second power source disposed at one side of the second swing arm unit 198. The second power source includes a second motor 201, a spline shaft 202, a displacement element 203 having one end provided with a shaft sleeve 2031 sleeved around and meshed with the spline shaft 202 and the other end provided with a pivot pin 2032 that extends through the connection stem 1971 of the first swing arm unit 197. The second swing arm unit 198 has an elongated axial slot 1983 permitting extension of the connection stem 1971 such that movement of the stem 1971 in the axial slot 1983 varies the position of the displacement element 203 on the spline shaft 202 and consequently varying the rotation angle of the spline shaft 202 relative to the pivot axle 1981. In other words, the distance between the connection stem 1971 and the pivot axle 1981, and thus the first swing arm unit 197 drives the second swing arm unit 198 in the rotation angle different from the previous ones.

The features of the present invention resides in that for coupling the first and second link boards together, the fixing screw is inserted through the first and second through holes in the first and second link boards for coupling with a fastener, thereby immobilizing the first and second link boards. By varying the extension position of the fixing screw through the first and second through holes in the first and second link boards for fastening with the fastener, the height of the bed with respect to the leg unit can be adjusted. In other words, repairing or replace the worn-out threads on the stem of the fastener screws encountered in the conventional bed supporting device can be avoided. Moreover, the presence of the horizontal moving structure and the swinging mechanism, which move the bed reciprocally in forward and rearward direction assists and enhances the sleeping quality of a sleeper on the bed.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bed supporting device adapted to be installed to a bottom seat of a bed, comprising:

a leg unit;

a first link board connected to an upper end of said leg unit, and formed with at least one first through hole;

a second link board adapted to be connected to the bottom seat of the bed, installed on said first link board, and formed with at least one second through hole corresponding to said first through hole; and an anti-slippery unit including a cushion plate disposed at a bottom end of said leg unit and formed with a screw hole;

wherein, either said first or second through hole is elongated such that a fixing screw can extend through said first and second through holes in said first and second link boards for coupling with a fastener, thereby immobilizing said first and second link boards;

wherein after assembly, a horizontal plane of the bottom seat of the bed and said leg unit define an acute angle in a clockwise direction which is lesser than 90 degrees or an obtuse angle in an anti-clockwise direction, which is greater than 90 degrees;

wherein said leg unit extends inclinedly and outwardly from the bottom seat of the bed due to said acute angle or said obtuse angle;

wherein said anti-slippery unit further includes an anti-slip pad disposed below said cushion plate opposite to said bottom end of said leg unit so as to be contact with a support surface and a fastener screw extending threadedly through said screw hole in said cushion plate for fastening said anti-slip pad; and wherein each of said first and second link boards has a coupling face formed with a shallow groove pattern to provide friction between said each coupling face after coupling of said first and second link boards.

2. The bed supporting device according to claim 1, wherein said first through hole in said first link board is elongated in cross section while said second through hole in said second link board is circular in cross section.

3. The bed supporting device according to claim 1, wherein said first through hole in said first link board is circular in cross section while said second through hole in said second link board is elongated in cross section.

* * * * *